United States Patent
Xu et al.

(10) Patent No.: US 11,269,726 B2
(45) Date of Patent: Mar. 8, 2022

(54) METHOD AND DEVICE FOR MANAGING STORAGE SYSTEM

(71) Applicant: EMC IP Holding Company LLC, Hopkinton, MA (US)

(72) Inventors: Tao Xu, Beijing (CN); Xinlei Xu, Beijing (CN); Liam Xiongcheng Li, Beijing (CN); Lifeng Yang, Beijing (CN); Jian Gao, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 154 days.

(21) Appl. No.: 16/021,699

(22) Filed: Jun. 28, 2018

(65) Prior Publication Data
US 2019/0121698 A1     Apr. 25, 2019

(30) Foreign Application Priority Data
Jun. 30, 2017 (CN) .......................... 201710523938.5

(51) Int. Cl.
*G06F 11/00* (2006.01)
*G06F 11/10* (2006.01)
*G06F 11/20* (2006.01)

(52) U.S. Cl.
CPC ...... *G06F 11/1088* (2013.01); *G06F 11/1076* (2013.01); *G06F 11/2094* (2013.01); *G06F 2201/82* (2013.01)

(58) Field of Classification Search
CPC ............. G06F 11/1088; G06F 11/1076; G06F 11/2094
See application file for complete search history.

(56) References Cited

U.S. PATENT DOCUMENTS

| 6,079,029 | A  | * | 6/2000 | Iwatani ............... G06F 11/1084 |
| | | | | 714/6.12 |
| 8,799,705 | B2 | | 8/2014 | Hallak et al. |
| 8,990,495 | B2 | | 3/2015 | Hallak et al. |
| 9,063,910 | B1 | | 6/2015 | Hallak et al. |
| 9,552,258 | B2 | | 1/2017 | Hallak et al. |

(Continued)

FOREIGN PATENT DOCUMENTS

CN    101923441 A    12/2010
CN    105653406 A    6/2016

OTHER PUBLICATIONS

Vanover, RAID 5 or RAID 6: Which should you select?, May 23, 2010, TechRepublic, 7 pages (Year: 2010).*

*Primary Examiner* — Katherine Lin
(74) *Attorney, Agent, or Firm* — BainwoodHuang

(57) ABSTRACT

A method and device for managing a storage system comprising multiple storage devices in a first layer and at least one backup storage device in a second layer. In response to receiving a request for writing target data to the storage system, storing the target data to a first portion of storage devices among the multiple storage devices in the first layer; storing a first parity, determined on the basis of a first algorithm, of data in the first portion of storage devices to a second portion of storage devices among the multiple storage devices in the first layer; and storing a second parity, determined on the basis of a second algorithm, of data in the first portion of storage devices to a first backup storage device of the at least one backup storage device in the second layer.

20 Claims, 11 Drawing Sheets

(56) References Cited

U.S. PATENT DOCUMENTS

| | | |
|---|---|---|
| 9,804,939 B1 | 10/2017 | Bono et al. |
| 9,921,912 B1 | 3/2018 | Vankamamidi et al. |
| 2006/0036901 A1* | 2/2006 | Yang .................. G06F 11/2074 714/6.12 |
| 2006/0085674 A1* | 4/2006 | Ananthamurthy .. G06F 11/1088 714/6.12 |
| 2013/0173955 A1* | 7/2013 | Hallak ................ G06F 12/0866 714/6.24 |

* cited by examiner

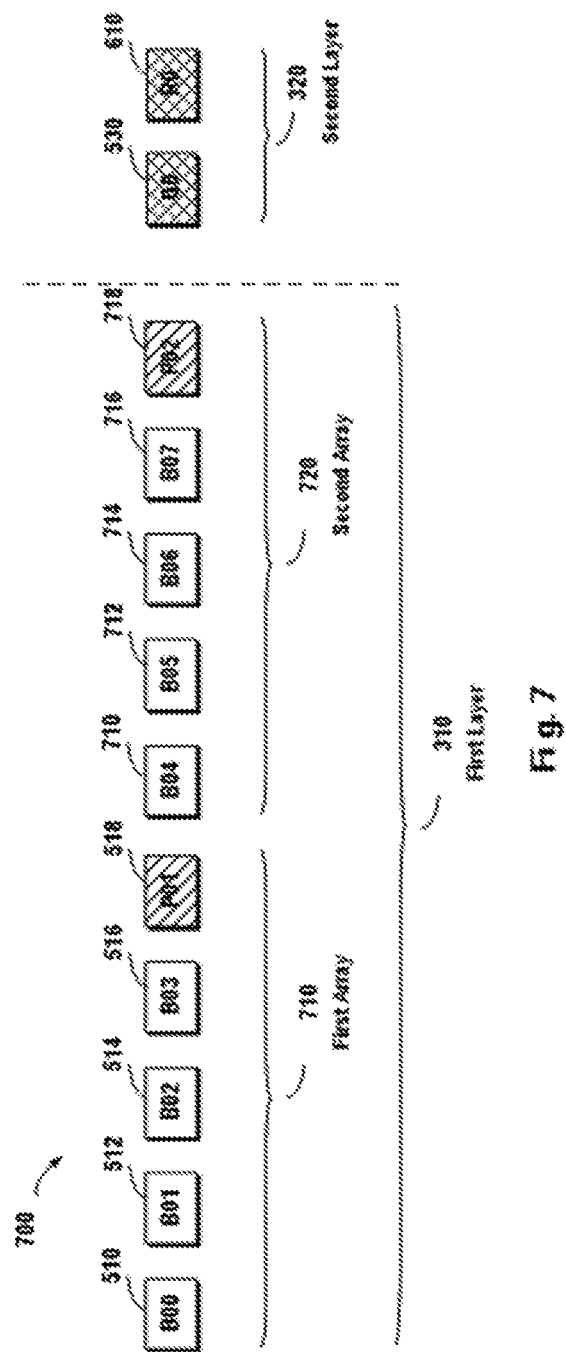

METHOD AND DEVICE FOR MANAGING STORAGE SYSTEM

RELATED APPLICATIONS

This application claim priority from Chinese Patent Application Number CN201710523938.5, filed on Jun. 30, 2017 at the State Intellectual Property Office, China, titled "METHOD AND APPARATUS FOR MANAGING STORAGE SYSTEM" the contents of which is herein incorporated by reference in its entirety.

FIELD

Various implementations of the present disclosure relate to storage management, and more specifically, to a method and device for managing a storage system (e.g., Redundant Array of Independent Disks (RAID)).

BACKGROUND

With the development of data storage techniques, various data storage devices provide users with an increasingly high data storage capacity, and also their data access speed has been improved greatly. Besides the increase of data storage capacity, users also impose greater and greater demands on data reliability and response time of storage systems.

So far various RAID-based data storage systems have been developed to improve data reliability. When one or more disks in a storage system fail, data in failing disk(s) can be recovered from other normal disk. However, the longer storage devices in the storage system are used, the higher the probability that these storage devices fail will be. As the storage system is used for a longer time, the probability of failure occurrence in the storage system will get higher. Therefore, it becomes a research hotspot regarding how to manage a storage system in a more reliable and secure way and further reduce the likelihood of data loss in the storage system.

SUMMARY

Therefore, it is desirable to develop and implement a technical solution for managing a storage system in a more secure and reliable way. It is desired that the technical solution can be compatible with existing storage systems and manage data in existing storage systems by changing various configurations of these storage systems.

In one implementation of the present invention, there is provided a method for managing a storage system. The storage system comprises multiple storage devices in a first layer and at least one backup storage device in a second layer. The method comprises: in response to receiving a request for writing target data to the storage system, storing the target data to a first portion of storage devices among the multiple storage devices in the first layer, storing a first parity, determined on the basis of a first algorithm, of data in the first portion of storage devices to a second portion of storage devices among the multiple storage devices in the first layer; and storing a second parity, determined on the basis of a second algorithm, of data in the first portion of storage devices to a first backup storage device of the at least one backup storage device in the second layer.

In one implementation of the present invention, there is provided a device for managing a storage system. The device comprises one or more processors; a memory coupled to at least one processor of the one or more processors; computer program instructions stored in the memory which, when executed by the at least one processor, cause the device to execute a method for managing a storage system. The storage system comprises multiple storage devices in a first layer and at least one backup storage device in a second layer. The method comprises: in response to receiving a request for writing target data to the storage system, storing the target data to a first portion of storage devices among the multiple storage devices in the first layer; storing a first parity, determined on the basis of a first algorithm, of data in the first portion of storage devices to a second portion of storage devices among the multiple storage devices in the first layer; and storing a second parity, determined on the basis of a second algorithm, of data in the first portion of storage devices to a first backup storage device of the at least one backup storage device in the second layer.

In one implementation of the present invention, there is provided a device for managing a storage system. The device comprises: a first storage module configured to, in response to receiving a request for writing target data to the storage system, store the target data to a first portion of storage devices among the multiple storage devices in the first layer, a second storage module configured to store a first parity, determined on the basis of a first algorithm, of data in the first portion of storage devices to a second portion of storage devices among the multiple storage devices in the first layer; and a third storage module configured to store a second parity, determined on the basis of a second algorithm, of data in the first portion of storage devices to a first backup storage device of the at least one backup storage device in the second layer.

In one implementation of the present invention, there are provided computer program instructions which, when executed by at least one processor, cause the at least one processor to execute a method for managing a storage system as described above.

With the technical solution of the present disclosure, the storage system may be managed with higher reliability, and further operating efficiency and security of the storage system may be improved.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings:

FIG. 7 schematically illustrates a block diagram of a storage system according to one implementation of the present disclosure.

DETAILED DESCRIPTION

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
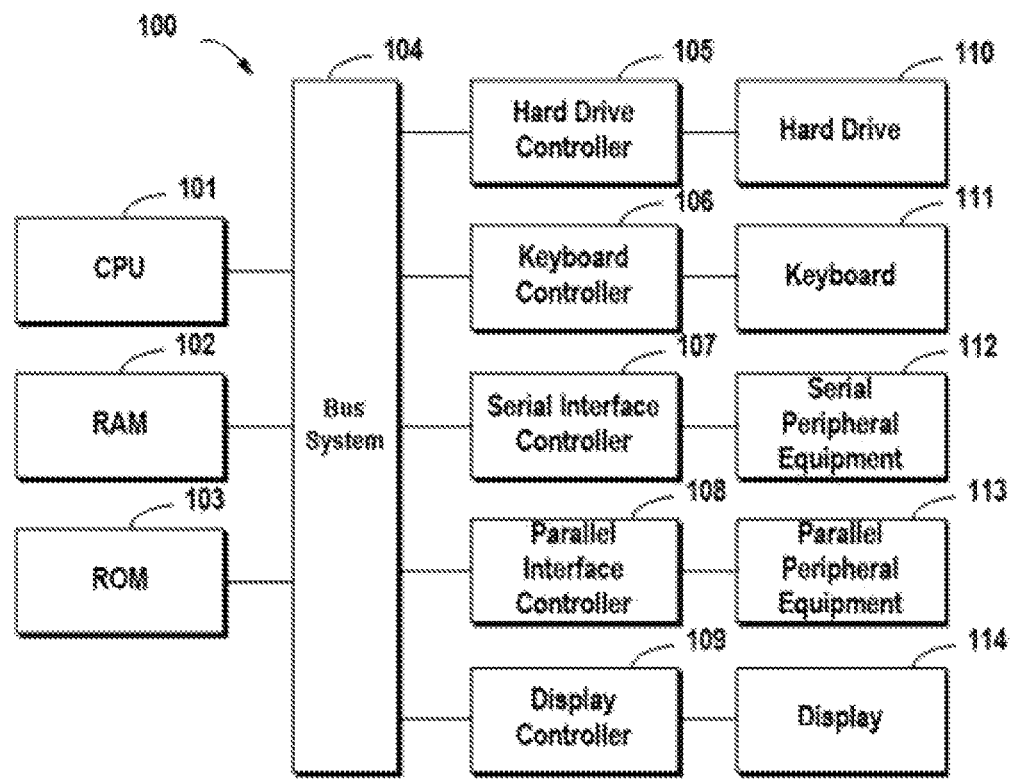
FIG. 1 schematically illustrates a block diagram of an exemplary computer system which is applicable to implement the implementations of the present disclosure.

FIG. 1 illustrates an exemplary computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices into an array of disks. By providing redundant storage devices, the reliability of an entire disk array is caused to significantly exceed that of a single storage device. RAID may offer various advantages over a single storage device, for example, enhancing data integrity, enhancing fault tolerance, increasing throughput or capacity, etc. There exist a number of RAID standards, such as RAID-1. RAID-2, RAID-3, RAID-4, RAID-5, RAID-6, triple-parity RAID, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
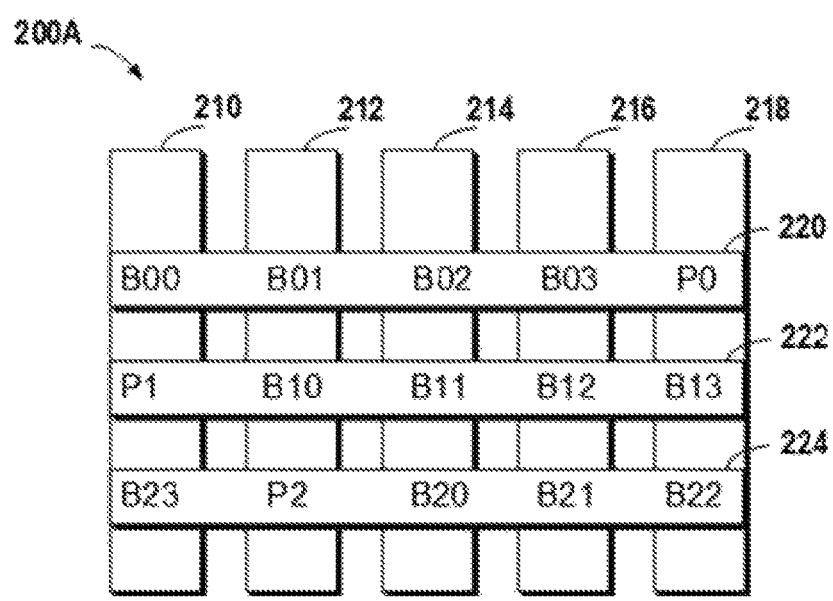
FIGS. 2A and 2B each schematically illustrate a view of an application environment where the implementations of the present disclosure may be implemented.

FIG. 2A schematically illustrates a schematic view 200A of a structure of RAID according to one technical solution. In this figure, RAID-5 (4D+1P, wherein 4D indicates 4 storage devices are used for storing data, while 1P indicates 1 storage device is used for storing a P parity) which consists of five independent storage devices (210, 212, 214, 216 and 218) are taken as an example for illustrating working principles of RAID. It should be noted although FIG. 2A shows only five storage devices, in other implementations more or less storage devices may be provided according to different versions of RAID. Moreover, although FIG. 2A shows stripes 220, 222 and 224, in other examples the RAID system may further comprise a different number of stripes.

In RAID, a stripe crosses multiple physical storage devices (for example, the stripe 220 crosses the storage devices 210, 212, 214, 216 and 218). The stripe may simply be construed as a storage area among multiple storage devices which satisfies a given address range. Data stored in the stripe 220 comprises multiple parts: data B00 stored in the storage device 210, data B01 stored in the storage device 212, data B02 stored in the storage device 214, data B03 stored in the storage device 216, and a P parity P0 stored in the storage device 218. In this example, the data blocks B00, B01, B02 and B03 are stored data, and the data block P0 is a parity of the stored data.

The way of storing data in other stripes is similar to that in the stripe 220A, and the difference is that a parity of other data block may be stored in other storage device than the storage device 218. In this manner, when one of the multiple storage devices 210, 212, 214, 216 and 218 fails, data in the failing device may be recovered from other normal storage devices.

Figure 2B:
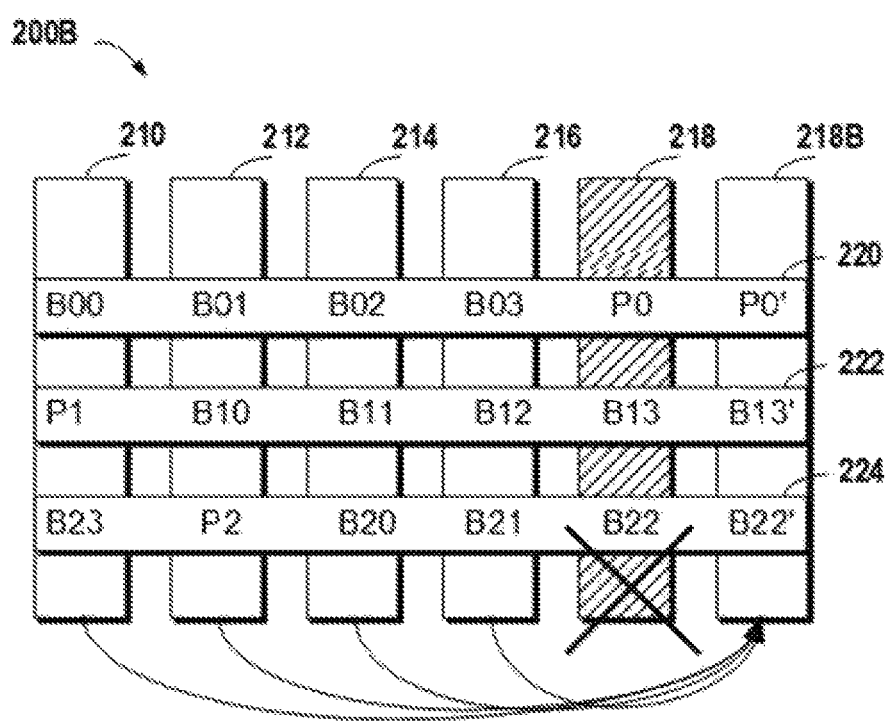

FIG. 2B schematically illustrates a schematic view 200B of the process of a RAID rebuild. As shown in FIG. 2B, when one storage device (e.g., the storage device 218 shown in shadow) fails, data may be recovered from the remaining storage devices 210, 212, 214 and 216 that operate normally. At this point, a new backup storage device 218B may be added to RAID to replace the storage device 218. In this manner, recovered data may be written to 218B, and a system rebuild may be effected. It is noteworthy that as a RAID-5 storage system consisting of 5 storage devices (4 of which are used for storing data and 1 of which is used for storing a parity) has been described with reference to FIGS. 2A and 2B, a storage system comprising a different number of storage devices may further exist according to the definition of other RAID level. For example, as RAID-6 defines, two storage devices may be used to store parities P and Q respectively. For another example, as triple-parity RAID defines, three storage devices may be used to store parities P, Q and R respectively.

It will be understood that usually the reliability of a storage device (e.g., hard drive) in a storage system decreases as the use time (since the storage device was put into use) increases. In other words, the longer the use time of a storage device, the greater the probability of failure occurrence in the storage device will be. Generally speaking, to ensure the security of data in a storage system, storage solutions having a higher reliability level may be adopted (e.g., RAID-B or triple-parity RAID). However, on the one hand storage solutions having a higher reliability level will lead to more expensive overhead. On the other hand, since these storage solutions need to save more redundant data, a data write will take a longer time, and further the access efficiency of the storage system is reduced. Therefore, how to strike a good tradeoff between reliability and access efficiency becomes a burning problem.

Brief Description of Implementations

Figure 3:
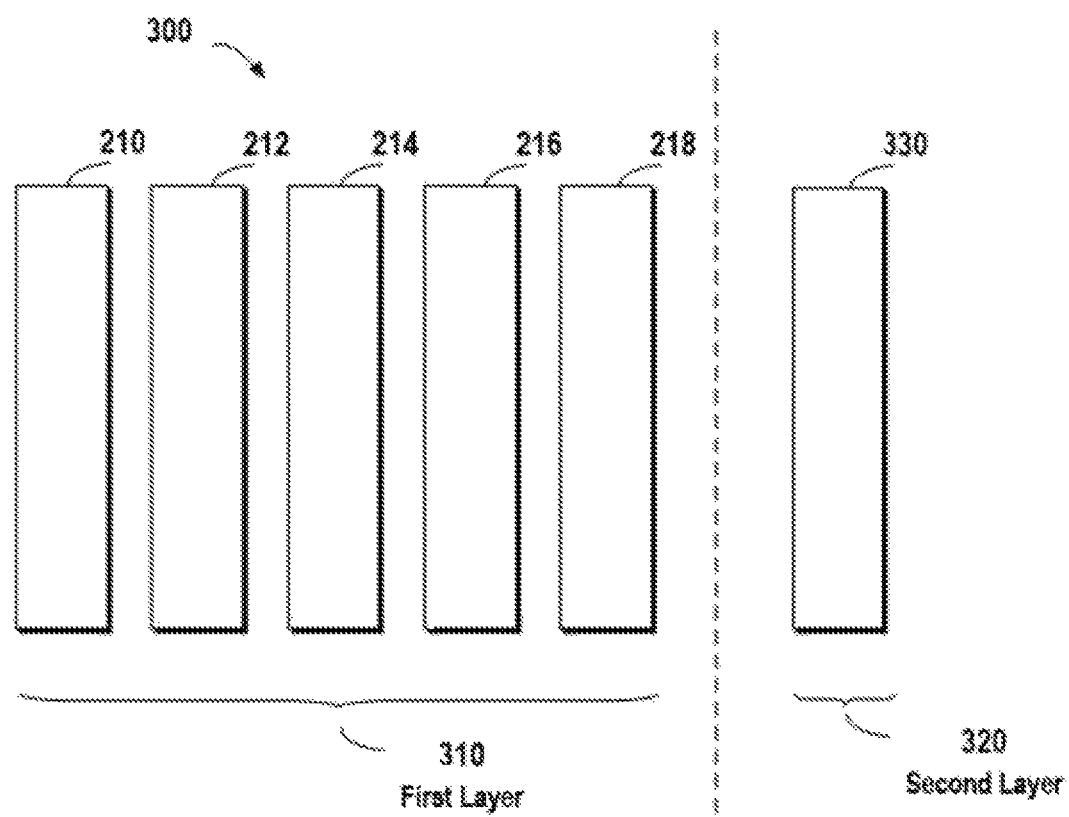
FIG. 3 schematically illustrates a block diagram of a storage system according to one implementation of the present disclosure.

To solve the above drawbacks, the implementations of the present disclosure provide a method, device and computer readable storage medium for managing a storage system. Specifically, according to one implementation of the present disclosure, there is provided a multi-layered storage system. FIG. 3 shows a block diagram of a storage system 300 according to one implementation of the present disclosure.

Specifically, the storage system 300 comprises multiple storage devices 210, 212, 214, 216 and 218 in a first layer 310 and at least one backup storage device 330 in a second layer 320. Here the multiple storage devices in the first layer 310 may be, for example, the multiple storage devices 210, 212, 214, 216 and 218 in the RAID-5 storage system as described with reference to FIGS. 2A and 2B. For the sake of description, here in the first layer 310 the storage devices 210, 212, 214 and 216 are used for storing data, and the storage device 218 is used for storing a parity. In addition, the storage system 300 further comprises the backup storage device 330 in the second layer 320.

According to one implementation of the present disclosure, the storage device in the first layer 310 is used for in response to a request from a user, storing target data specified by the request. Since the first layer 310 only comprises a small amount of redundant data, the target data can be quickly written to the storage system 300. The second layer 320 can store more parities on the basis of higher reliability. Therefore, after the target data is written to the first layer 310, a parity associated with the target data is determined and stored in the background of the storage system 300 on the basis of higher reliability.

According to one implementation of the present disclosure, the multiple storage devices in the first layer 310 may store data according to a lower reliability level (e.g., RAID-5), while the at least one backup storage device in the second layer 320 may store the target data and its related parity together with the storage device in the first layer 310 according to a higher reliability level (e.g., RAID-6 or triple-parity RAID).

With the storage system 300 as shown in FIG. 3, on one hand the target data may be written to the storage system 300 with higher efficiency, and on the other hand after the target data is written, the target data may further be stored in the storage system 300 on a higher reliability level. In this manner, the storage system 300 may be managed more reliably while a response speed of the storage system is guaranteed.

Although FIG. 3 schematically shows only one backup storage device 330, in other specific implementation multiple backup storage devices may further be provided. For example, when the second layer 320 is implemented on the basis of triple-parity RAID, another backup storage device may further be provided in addition to the backup storage device 330.

Workflow of Implementations

Figure 4:
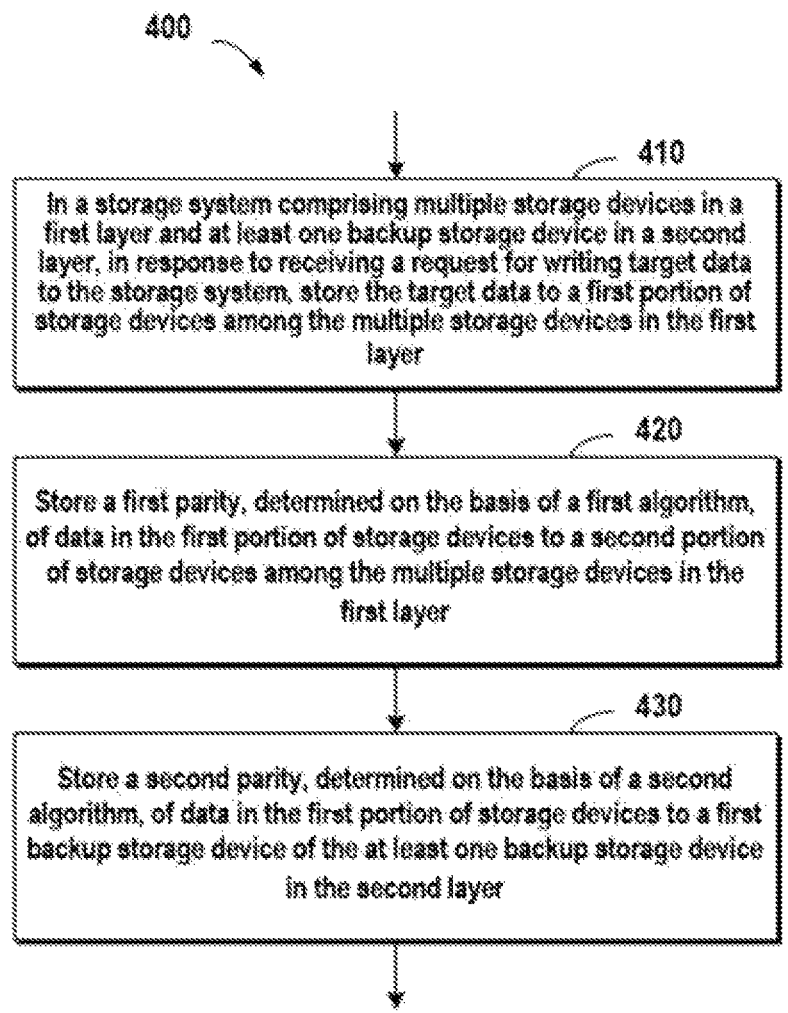
FIG. 4 schematically illustrates a flowchart of a method for managing a storage system according to one implementation of the present disclosure.

With reference to FIG. 4, description is presented below to more details of the implementations of the present disclosure, wherein FIG. 4 schematically shows a flowchart of a method 400 for managing a storage system according to one implementation of the present disclosure. The storage device in the method 400 may be the storage system 300 described with reference to FIG. 3 above. Specifically, in block 410, in response to receiving a request for writing target data to the storage system 300, the target data is stored to a first portion of storage devices among the multiple storage devices in the first layer 310. In this implementation, the first portion of storage devices may be storage devices for storing data in the first layer 310. Continuing the example of the storage system 300 as above described with reference to FIG. 3, at this point the first portion in the first layer 310 may comprise the storage devices 210, 212, 214 and 216, which are used for storing the target data.

In block 420, a first parity of data in the first portion of storage devices, which is determined on the basis of a first algorithm, is stored to a second portion of storage devices among the multiple storage devices in the first layer 310. Here the first algorithm may be an algorithm defined according to a lower reliability storage policy. For example, when the first layer 310 is formed on the basis of RAID-5, the first algorithm may be an algorithm for determining a P parity as supported by RAID-5, e.g., an "exclusive-OR" algorithm.

By distributing the target data over the multiple storage devices 210, 212, 214 and 216 and performing an "exclusive-OR" operation to data stored in each storage device, a first parity may be obtained. Further, the obtained first parity may be stored to a second portion of storage devices in the first layer 310. The second portion of storage devices may be a storage device for storing the parity. Continuing the example in FIG. 3, the second portion of storage devices may be the storage device 218.

According to one implementation of the present disclosure, in response to storing the first parity to the second portion of storage devices, a response indicating the target data has been written to the storage system 300 may be returned. At this point, since the target data and its parity have been written to the first layer 310 in the storage system 300, the target data is protected by a RAID-5 storage policy.

The operation shown in block 430 may be executed as a background inside the storage system 300. At this point, the response indicative of completion of the write operation has been returned to the user of the storage system 300, and the write interaction between the user and the storage system 300 is completed at this point. The user does not have to be concerned with a subsequent operation executed as a background inside the storage system 300. In other words, the operation shown in block 430 is transparent to the user. After executing the operation in block 430, the target data may get a more reliable guarantee, for example, may be stored according to RAID-6.

In block 430, a second parity of data in the first portion of storage devices may be determined on the basis of a second algorithm, and the second parity may be stored to a first backup storage device of the at least one backup storage device in the second layer 320. Further, in order to get higher reliability, a further parity of the target data may be stored using a backup storage device in the second layer 320. Specifically, a second parity of data (i.e., the target data) stored in the first portion (i.e., the storage devices 210, 212, 214 and 216) may be determined on the basis of an algorithm of a higher-reliability storage policy, and the second parity may be stored to a backup storage device in the second layer 320 (e.g., the backup storage device 330 as shown in FIG. 3).

Continuing the example in FIG. 3, the storage device 218 may store the first parity (e.g., P parity) of the target data, while the storage device 330 may store the second parity (e.g., Q parity) of the target data. At this point, the storage system 300 shown in FIG. 3 may form a 4D+1P+1Q (here, 4D indicates 4 storage devices are used for storing data, 1P indicates 1 storage device is used for storing a P parity, and 1Q indicates 1 storage device is used for storing a Q parity) RAID-6 storage array.

Figure 5A:
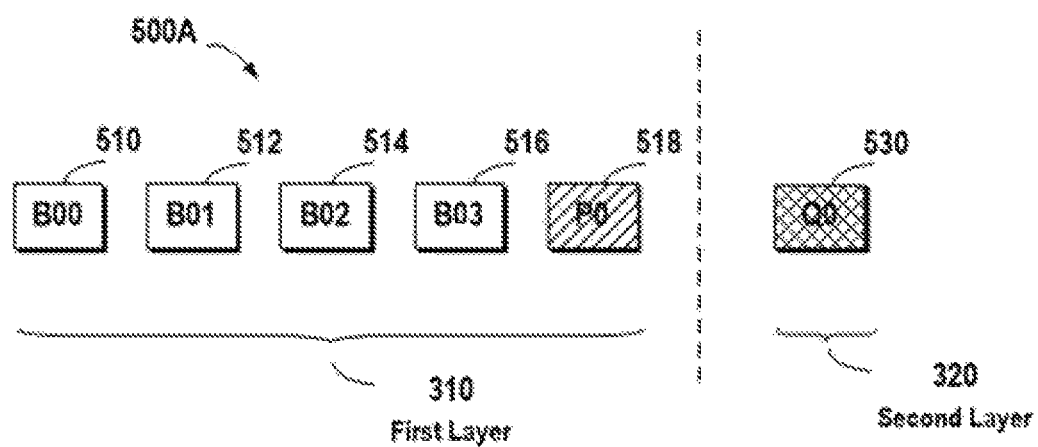
FIGS. 5A and 5B each schematically illustrate a block diagram of a storage system according to one implementation of the present disclosure.

With reference to FIG. 5A, a description is presented below to a concrete flow of the method 400. FIG. 5A schematically shows a block diagram of a storage system 500A according to one implementation of the present disclosure. For the sake of brevity, the storage system 500A in FIG. 5A comprises only one stripe. As shown in this figure, data blocks (e.g., data blocks 510, 512, 514 and 516) for storing data are shown in blank blocks, a data block (e.g., a data block 518) for storing the first parity is shown in a slash block, and a data block (e.g., a data block 530) for storing the second parity is shown in a grid block. At this point, the data blocks 510, 512, 514, 516 and 518 are located in the different storage devices 210, 212, 214, 216 and 218 respectively. Data B00, B01, B02 and B03 from the target data is stored in the data blocks 510, 512, 514 and 516 respectively, and a parity P0 of data B00, B01, B02 and B03 determined according to the first algorithm is stored in the data block 518.

In this implementation, the parity P0 may be determined on the basis of the definition of RAID-5. For example, the parity P0 may be determined on the basis of Equation 1 below:

$$P0 = F_P(B00, B01, B02, B03) \qquad \text{Equation 1}$$

It will be appreciated that as an example of the storage system comprising one stripe has been illustrated with reference to FIG. 5A, now an example of a storage system comprising multiple stripes is illustrated with reference to FIG. 5B. According to one implementation of the present disclosure, a parity associated with the first stripe and a parity associated with the second stripe are stored in different storage devices.

In other words, backup storage devices associated with different stripes may correspond to different physical storage devices. Specifically, a data block 530 for storing a second parity in a first stripe 542 and a data block 520 for storing a second parity in a second stripe 544 as shown in FIG. 5B may be located in different physical storage devices. With reference to the block diagram of the storage system 300 shown in FIG. 3, the data block 530 may be located in the storage device 330, while the data block 520 may be located in the storage device 210.

When the storage system comprises a further stripe, a second parity associated with the further stripe may be located in the storage device 212, 214, 216 or 218 as shown in FIG. 3. According to one implementation of the present disclosure, when there exist multiple stripes, a position where a second parity associated with a current stripe is stored may be offset so as to determine a position where a second parity associated with a next stripe is stored. For example, regarding the storage system 300 comprising 6 storage devices as shown in FIG. 3, a second parity associated with the first stripe may be stored to the first storage device 210 in the storage system 300, a second parity associated with the second stripe may be stored to the second storage device 212 in the storage system 300, . . . , and a second parity associated with the $6^{th}$ stripe may be stored to the $6^{th}$ storage device 330 in the storage system 300. After all the 6 storage devices in the storage devices 300 are used by the first 6 stripes, a next cycle may start. That is, a second parity associated with the $7^{th}$ stripe may be stored to the first storage device 210 in the storage system 300, a second parity associated with the $8^{th}$ stripe may be stored to the second storage device 212 in the storage system 300, . . . , and so on and so forth.

According to the implementation of the present disclosure, the operation shown in block 430 may be triggered on the basis of different rules. For example, the operation may be triggered immediately after the target data is written to the first layer 310, or the operation may be triggered in response to receiving a request for improving reliability of the storage system.

If the operation for improving the reliability is initiated after data in the first portion is modified, then a parity of the modified data in the first portion may be determined as the second parity on the basis of the second algorithm. Subsequently, the determined second parity is stored to the first backup storage device. At this point, data in the storage system will get a more reliable protection. For example, in the example as shown in FIGS. 5A and 5B, the storage system will be upgraded from previous RAID-5 (4D+1P) to higher-reliability RAID-6 (4D+1P+1Q).

According to one implementation of the present disclosure, a mark may set for each stripe, and further the mark may be used to indicate whether to initiate the above process of improving reliability of the storage system. Next, in response to determining a mark for a certain stripe is set, a second parity may be determined on the basis of data in the stripe and stored in a backup storage device.

Specifically, the mark may be set under different conditions. For example, in response to data in the first portion of storage devices in the first layer comprised in the first stripe being modified, a mark may be set for the first stripe and used as a request for improving reliability of the first stripe comprised in the storage system. For another example, since it will take resources in the storage system to determine and store a second parity, when to execute an operation for improving the reliability may be determined according to workloads of the storage system.

When the storage system comprises multiple stripes, an operation may be performed only to data in a given stripe on the basis whether a mark is set for the given stripe. Specifically, a parity of modified data in the first portion of storage devices in the first layer in the first stripe may be determined on the basis of the second algorithm and used as the second parity; and the second parity may be stored to the first backup storage device.

It will be appreciated that a circumstance where a second parity (wherein the second parity comprises only a Q parity) is stored using a single backup storage device has been described with reference to FIGS. 5A and 5B. In other implementations, more parities (e.g., a Q parity and an R parity) may further be used, and the Q parity and the R parity may be stored using two respective storage devices. With reference to FIGS. 6A and 6B, a description is presented below, wherein FIGS. 6A and 6B schematically show block diagrams 600A and 600B of a storage system according to one implementation of the present disclosure respectively.

According to one implementation of the present disclosure, a third parity of data in the first portion of storage devices which is determined on the basis of a third algorithm may be stored to a second backup storage device of the at least one backup storage device in the second layer. FIG. 6A shows a concrete example of performing the above process to one stripe. FIG. 6A is similar to FIG. 5A and differs from FIG. 5A in that each stripe may comprise two data blocks 530 and 610 for storing two parities (i.e., Q and R parities) respectively.

At this point, a second parity and a third parity may be determined on the basis of algorithms for determining Q and R parities as defined in RAID-6, and the second parity and the third parity may be respectively stored to the data blocks 530 and 610 in the second layer 320. Specifically, the Q parity and the R parity may be determined on the basis of Equations 2 and 3 below:

$$Q0=F_Q(B00,B01,B02,B03) \quad \text{Equation 2}$$

$$R0=F_R(B00,B01,B02,B03) \quad \text{Equation 3}$$

FIG. 6B schematically shows a circumstance where the storage system comprises multiple stripes, wherein data blocks in the multiple stripes may be distributed in a manner as above described with reference to FIG. 5B. FIG. 6B is similar to FIG. 5B and differs from FIG. 5B in that each stripe may comprise two data blocks for storing two parities (i.e., Q and R parities) respectively. Alternatively, though not shown, the second layer 320 may further comprise more backup storage devices to support a higher reliability level.

The circumstance where the first layer 310 comprises one redundant array has been described above with reference to FIGS. 5A, 5B, 6A and 6B. According to one implementation of the present disclosure, storage devices in the first layer may comprise multiple redundant arrays. At this point, the storing the second parity to the first backup storage device comprises: on the basis of the second algorithm, determining the second parity according to data in a first portion of storage devices and a second portion of storage devices comprised in each redundant array among the multiple redundant arrays; and storing the determined second parity to the first backup storage device.

With reference to FIG. 7, a description is presented below to a circumstance where the first layer 310 comprises multiple redundant arrays. As shown in this figure, the first layer 310 comprises a first array 710 and a second array 720. The first array 710 comprises multiple storage devices, wherein data blocks 510, 512, 514 and 516 located in multiple storage devices are used for storing data B00, B01, B02 and B03 respectively, and a data block 518 is used for storing a P parity (denoted as P01). The second array 720 comprises multiple storage devices, where data blocks 710, 712, 714 and 716 located in multiple storage devices are used for storing data B04, B05, B06 and B07 respectively, and a data block 718 is used for storing a P parity (denoted as P02).

A storage system 700 shown in FIG. 7 supports a triple-parity RAID rule, and the second layer 320 comprises two storage devices. Data blocks 530 and 610 are located in two different storage devices and used for storing a Q parity Q0 and an R parity R0 respectively. At this point, the various parities P01, P02, Q0 and R0 may be determined on the basis of an equation set as below.

$$P01=F_P(B00,B01,B02,B03)$$

$$P02=F_P(B04,B05,B06,B07)$$

$$Q0=F_Q(B00,B01,B02,B03,B04,B05,B06,B07)$$

$$R0=F_R(B00,B01,B02,B03,B04,B05,B06,B07) \quad \text{Equation Set 1}$$

Figure 5B:
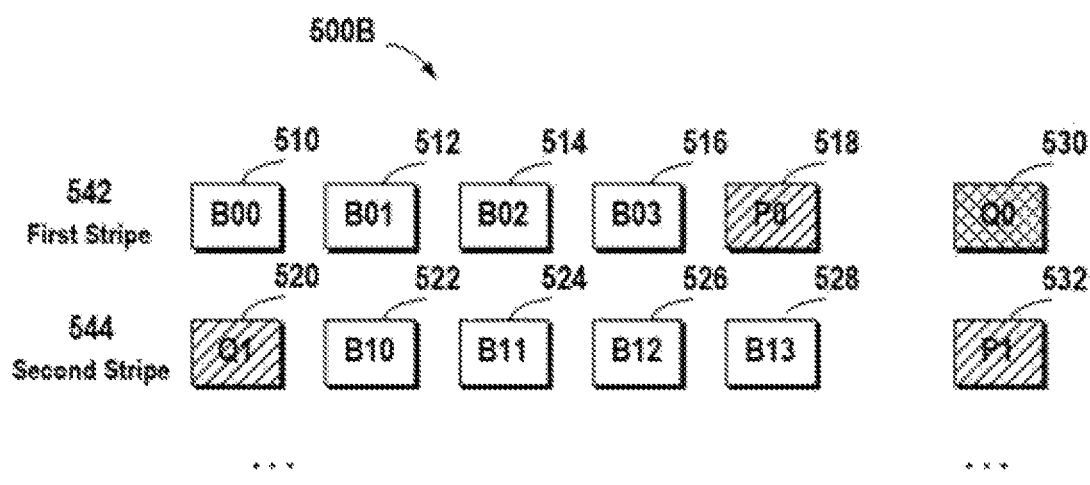
Figure 6A:
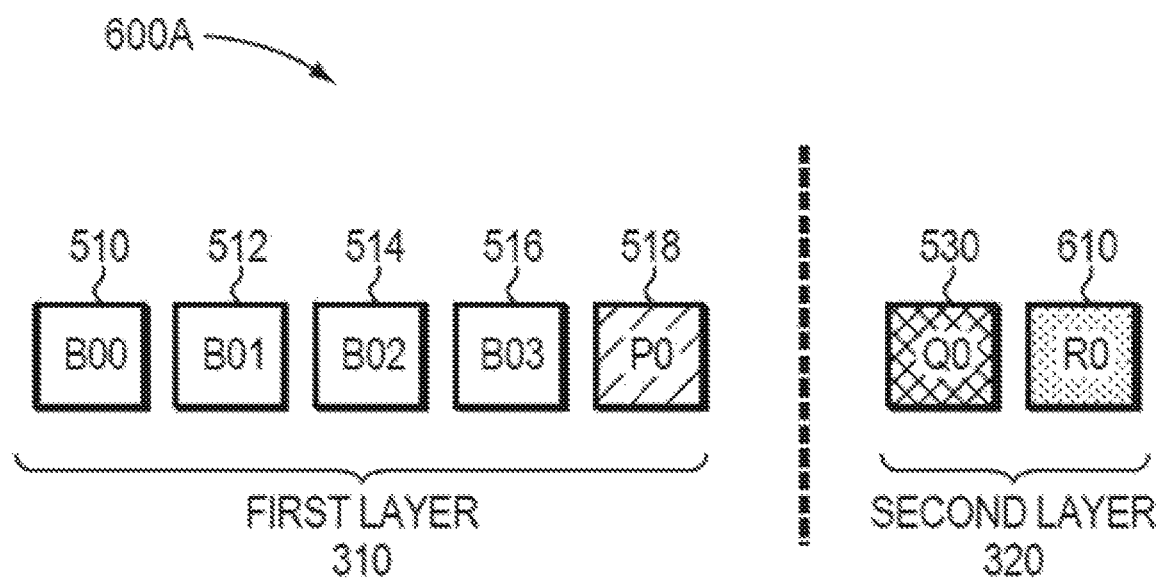
FIGS. 6A and 6B each schematically illustrate a block diagram of a storage system according to one implementation of the present disclosure.
Figure 6B:
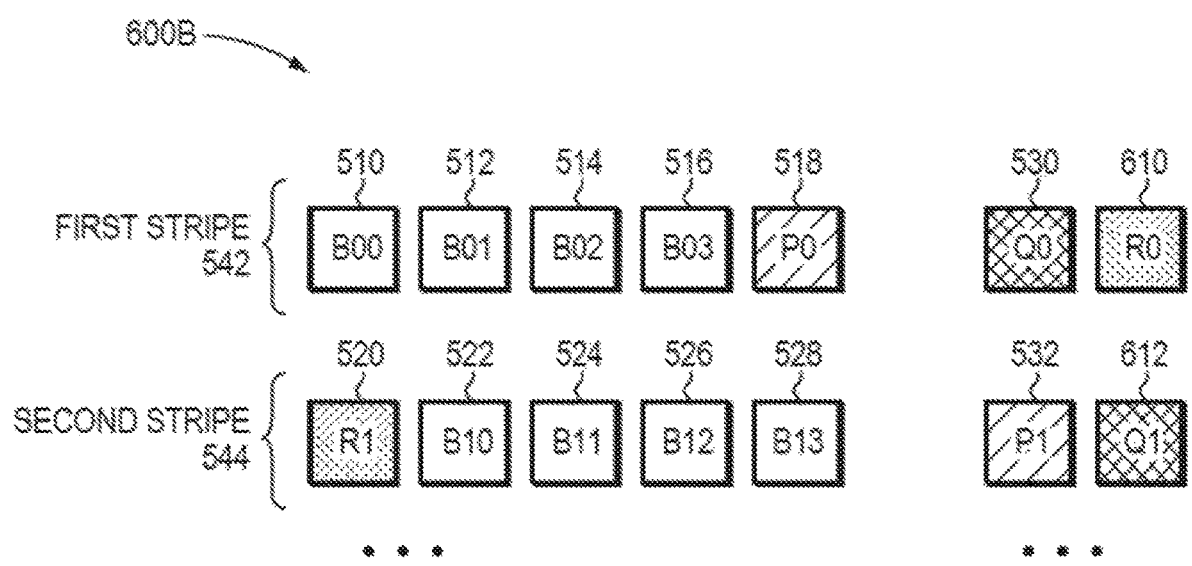

It will be appreciated although FIG. 7 illustrates an example of one stripe in the storage system, in other implementations, like the example shown in FIGS. 5B and 6B, the storage system may further comprise multiple stripes, and a Q parity and an R parity in multiple stripes may be stored in different storage devices. Specifically, positions where a Q parity and an R parity associated with a current stripe are stored may be offset so as to determine positions where a Q parity and an R parity associated with a next stripe are stored.

It will be appreciated although the circumstance where the first layer 310 adopts 4D+1P RAID-5 has been described with reference to figures, according to one implementation of the present disclosure, the first layer may further adopt a redundant array supporting other rule. For example, the first layer 310 may comprise two redundant arrays of 4D+1P+1Q, and the second layer 320 may comprise a storage device for storing an R parity. At this point, the entire storage system may support triple parities.

With the storage system according to the various implementations of the present disclosure, more parities may be calculated as a background inside the storage system so as to support higher reliability. Further, when the first layer 310 comprises multiple redundant arrays, high reliability may further be provided while usage efficiency of data in the storage capacity is ensured. In the example with reference to FIG. 7, 12 storage devices are used, and a first layer 310 and a second layer 320 are involved, wherein the first layer 310 comprises two RAID-5 arrays of 4D+1P, and the second layer 320 comprises two storage device for storing Q and R parities respectively. At this point, a total of 4+4=8 storage devices in the storage system are used for storing data, 1+1+1+1=4 storage devices are used for storing two P parities, one Q parity and one R parity respectively. At this point, a data ratio equals 8/12, and triple-parity RAID is supported.

If a storage system is constructed on the basis of two RAID-5 of 4D+1P, at this point a data ratio is 4/(4+1)=4/5. Compared with the storage system 700 as shown in FIG. 7, although the data ratio 4/5>8/12, the constructed storage system only supports lower reliability (i.e., only supports RAID-5), whereas the storage system 700 according to one implementation of the present disclosure supports more reliable triple-parity RAID.

If a storage system is constructed on the basis of two RAID-5 of 5D+1P, at this point a data ratio is 5/(5+1)=5/6. Compared with the storage system 700 as shown in FIG. 7, although the data ratio 5/6>8/12, the constructed storage system only supports lower reliability (i.e., only supports RAID-5), whereas the storage system 700 according to one implementation of the present disclosure supports more reliable triple-parity RAID.

Recovery of Storage System

With the implementations of the present disclosure, when one or more storage devices in the storage system fail, data in failing device(s) may be recovered on the basis of redundant data stored in the storage system.

According to one implementation of the present disclosure, in response to a first device among the multiple storage device in the first layer failing, data in the first device is recovered on the basis of data in other storage device than the first device in the first layer. In this implementation, if only one storage device in the first layer fails, then data in the failing device may be recovered on the basis of data in a normal device in the first layer.

In one example, suppose a device in the first layer 310 in FIG. 7 where the data block 512 is located fails. At this point, the data blocks 510, 512, 514, 516 and 518 are data blocks in one stripe in a 4D+1P redundant array, and data B0, B01, B02, B03 and P01 stored in these data blocks satisfies the following relation: P01=$F_P$(B00, B01, B02, B03). Therefore, data B01 in the data block 512 may be recovered on the basis of data B00, B02, B03 and P01 stored in the data blocks 510, 514, 516 and 518 respectively.

In one example, suppose a device in the first layer 310 in FIG. 7 where the data block 518 is located fails. At this point, data P01 in the data block 518 may be recovered on the basis of data B00, B01, B02 and B03 stored in the data blocks 510, 512, 514 and 516 respectively.

According to one implementation of the present disclosure, in response to the first backup storage device failing, the second parity of the data in the first portion of storage devices is determined on the basis of the second algorithm; and data in the first backup storage device is recovered on the basis of the second parity.

In one example, suppose a device in the second layer 320 in FIG. 7 where the data block 530 is located fails. At this point, data in the data block 530 may be recovered on the basis of data (i.e., data B00 to B07) stored in the first portion in the first layer 310 respectively.

According to one implementation of the present disclosure, in response to a first device and a second device among the multiple storage devices in the first layer failing, data in the first device and the second device is recovered on the basis of data in other storage device than the first device and the second device in the storage system.

In one example, suppose the failing first and second devices belong to different redundant arrays (e.g., the first array 710 and the second array 720 as shown in FIG. 7), then a recovery may be carried out on the basis of data in a normal device in each array. With reference to FIG. 7, suppose both devices where the data blocks 512 and 517 are located fail, then according to a RAID-5 recovery rule, data B01 in the data block 512 may be recovered on the basis of data B00, B02, B03 and P01 stored in the data blocks 510, 514, 516 and 518 respectively, and data B05 in the data block 712 may be recovered on the basis of data B04, B06, B07 and P02 in the data blocks 710, 714, 716 and 718 respectively.

In one example, suppose the failing first and second devices belong to the same redundant array, at this point a recovery process will involve a RAID-5 rebuild and a RAID-6 rebuild.

It will be appreciated although FIG. 7 has shown the circumstance where the first layer 310 comprises two redundant arrays, in other implementations the first layer 310 may further comprise more redundant arrays (e.g., 3 RAID-5 arrays). Suppose three storage devices in the storage system fail. If the three failing devices belong to 3 RAID-5 arrays, then a recovery process will involve three RAID-5 rebuilds. If the three failing devices belong to two different RAID-5 arrays, then a recovery process will involve a RAID-5 rebuild and a RAID-6 rebuild. If the three failing devices belong to one identical RAID-5 array, then a recovery will involve a triple-parity RAID rebuild.

Implementations of Present Disclosure

Figure 8:
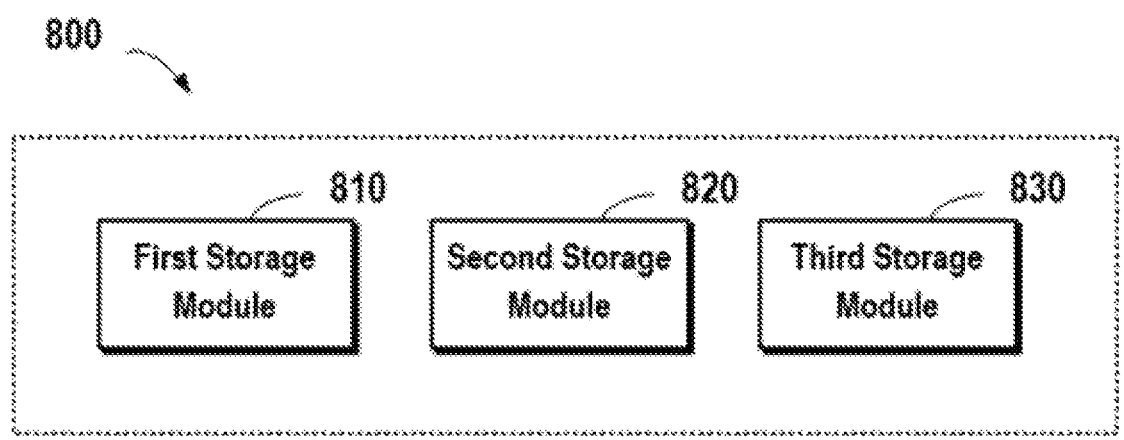
FIG. 8 schematically illustrates a block diagram of a device for managing a storage system according to one implementation of the present disclosure.

FIG. 8 schematically shows a block diagram of a device 800 for managing a storage system according to one implementation of the present disclosure. The storage system comprises multiple storage devices in a first layer and at least one backup storage device in a second layer. The device 800 comprises: a first storage module 810 configured to, in response to receiving a request for writing target data to the storage system, store the target data to a first portion of storage devices among the multiple storage devices in the first layer; a second storage module 820 configured to store a first parity, determined on the basis of a first algorithm, of data in the first portion of storage devices to a second portion of storage devices among the multiple storage devices in the first layer; and a third storage module 830 configured to store a second parity, determined on the basis of a second algorithm, of data in the first portion of storage devices to a first backup storage device of the at least one backup storage device in the second layer.

According to one implementation of the present disclosure, the device 800 further comprises: a returning module configured to, in response to storing the first parity to the second portion of storage devices, return a response indicating the target data has been written to the storage system.

According to one implementation of the present disclosure, the third storage module 830 is further configured to: in response to receiving a request for improving reliability of the storage system, store the second parity to the first backup storage device.

According to one implementation of the present disclosure, the device 800 further comprises: a request module configured to, in response to data in the first portion of storage devices being modified, send the request.

According to one implementation of the present disclosure, the third storage module 830 is further configured to: determine the second parity on the basis of a parity, determined according to the second algorithm, of modified data in the first portion of storage devices; and store the determined second parity to the first backup storage device.

According to one implementation of the present disclosure, the storage system comprises a first stripe comprising multiple storage devices in a first layer and at least one backup storage device in a second layer. The request module is further configured to: in response to data in a first portion of storage devices in the first layer comprised in the first stripe being modified, set a mark for the first stripe as a request for improving reliability of the first stripe comprised in the storage system.

According to one implementation of the present disclosure, the third storage module 830 is further configured to: determine the second parity on the basis of a parity, determined according to the second algorithm, of modified data in the first portion of storage devices in the first layer of the first stripe; and store the second parity to a first backup storage device of the at least one backup storage device comprised in the first stripe.

According to one implementation of the present disclosure, the third storage module 830 is further configured to: store a third parity, determined on the basis of a third algorithm, of data in the first portion of storage devices to a second backup storage device of the at least one backup storage device in the second layer.

According to one implementation of the present disclosure, the device 800 further comprises: a recovery module configured to: in response to a first device among the multiple storage devices in the first layer failing, recover data in the first device on the basis of data in other storage device than the first device in the first layer.

According to one implementation of the present disclosure, the recovery module is further configured to: in response to the first backup storage device failing, determine the second parity of the data in the first portion of storage devices on the basis of the second algorithm; and recover data in the first backup storage device on the basis of the second parity.

According to one implementation of the present disclosure, the recovery module is further configured to: in response to a second storage device in the storage system failing, recover data in the first device and the second device on the basis data in other storage device than the first device and the second device in the storage system.

According to one implementation of the present disclosure, the storage system comprises a second stripe comprising multiple storage devices in a first layer and at least one backup storage device in a second layer. The device 800 further comprises: a deployment module configured to store a second parity associated with the first stripe and a second parity associated with the second stripe to different storage devices.

According to one implementation of the present disclosure, storage devices in the first layer comprise at least one redundant array. The third storage module 830 is further configured to: determine the second parity on the basis of the second algorithm according to data in a first portion of storage devices and a second portion of storage devices comprised in each redundant array of the at least one redundant array; and store the determined second parity to the first backup storage device.

In one implementation of the present invention, there is provided a device for managing a storage system, comprising: one or more processors; a memory coupled to at least one processor of the one or more processors; computer program instructions stored in the memory which, when executed by the at least one processor, cause the device to execute a method for managing a storage system that comprises multiple storage devices in a first layer and at least one backup storage device in a second layer. The method comprising: in response to receiving a request for writing target data to the storage system, storing the target data to a first portion of storage devices among the multiple storage devices in the first layer; storing a first parity, determined on the basis of a first algorithm, of data in the first portion of storage devices to a second portion of storage devices among the multiple storage devices in the first layer; and storing a second parity, determined on the basis of a second algorithm, of data in the first portion of storage devices to a first backup storage device of the at least one backup storage device in the second layer.

According to one implementation of the present disclosure, the method further comprises: in response to storing the first parity to the second portion of storage devices, returning a response indicating the target data has been written to the storage system.

According to one implementation of the present disclosure, the storing the second parity to the first backup storage device comprises: in response to receiving a request for improving reliability of the storage system, storing the second parity to the first backup storage device.

According to one implementation of the present disclosure, the method further comprises: in response to data in the first portion of storage devices being modified, sending the request.

According to one implementation of the present disclosure, the storing the second parity to the first backup storage device further comprises: determining the second parity on the basis of a parity, determined according to the second algorithm, of modified data in the first portion of storage devices; and storing the determined second parity to the first backup storage device.

According to one implementation of the present disclosure, the storage system comprises a first stripe comprising multiple storage devices in a first layer and at least one backup storage device in a second layer, wherein the sending the request comprises: in response to data in a first portion of storage devices in the first layer comprised in the first stripe being modified, setting a mark for the first stripe as a request for improving reliability of the first stripe comprised in the storage system.

According to one implementation of the present disclosure, storing the second parity to the first backup storage device further comprises: determining the second parity on the basis of a parity, determined according to the second algorithm, of modified data in the first portion of storage devices in the first layer of the first stripe; and storing the second parity to a first backup storage device of the at least one backup storage device comprised in the first stripe.

According to one implementation of the present disclosure, the method further comprises: storing a third parity, determined on the basis of a third algorithm, of data in the first portion of storage devices to a second backup storage device of the at least one backup storage device in the second layer.

According to one implementation of the present disclosure, the method further comprises: in response to a first device among the multiple storage devices in the first layer failing, recovering data in the first device on the basis of data in other storage device than the first device in the first layer.

According to one implementation of the present disclosure, the method further comprises: in response to the first backup storage device failing, determining the second parity of the data in the first portion of storage devices on the basis of the second algorithm; and recovering data in the first backup storage device on the basis of the second parity.

According to one implementation of the present disclosure, the method further comprises: in response to a second storage device in the storage system failing, recovering data in the first device and the second device on the basis data in other storage device than the first device and the second device in the storage system.

According to one implementation of the present disclosure, the storage system comprises a second stripe comprising multiple storage devices in a first layer and at least one backup storage device in a second layer, the method further comprising: storing a second parity associated with the first stripe and a second parity associated with the second stripe to different storage devices.

According to one implementation of the present disclosure, storage devices in the first layer comprise at least one redundant array, wherein the storing the second parity to the first backup storage device comprises: determining the second parity on the basis of the second algorithm according to data in a first portion of storage devices and a second portion of storage devices comprised in each redundant array of the at least one redundant array; and storing the determined second parity to the first backup storage device.

In one implementation of the present invention, there is provided a computer readable storage medium on which computer program instructions are stored, the computer program instructions, when executed by at least one processor, causing the at least one processor to execute a method for managing a storage system as described above.

In one implementation of the present invention, there are provided computer program instructions which, when executed by at least one processor, cause the at least one processor to execute a method for managing a storage system as described above.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The invention claimed is:

1. A method for managing a storage system, the storage system comprising multiple storage devices in a first layer and at least one backup storage device in a second layer, the method comprising:
    in response to receiving a request for writing target data to the storage system, storing the target data to a first portion of storage devices among the multiple storage devices in the first layer;
    providing a first RAID level of reliability to the stored target data, the providing of the first RAID level of reliability comprising:
        determining, on the basis of a first algorithm, a P parity of the target data stored in the first portion of storage devices; and
        storing the P parity to a second portion of storage devices among the multiple storage devices in the first layer;
    in response to the storing of the P parity, returning a response indicating that the target data has been written to the storage system; and in a background process:
  providing a second RAID level of reliability to the target data, the providing of the second RAID level of reliability comprising:
    determining, in the background process, a Q parity of the target data on the basis of a second algorithm; and
    storing, in the background process, the Q parity to a first backup storage device of the at least one backup storage device in the second layer, the storage system having higher access efficiency due to the determining and the storing of the single P parity of the target data in the first layer, and the storage system having higher reliability due to the determining and the storing, in the background process, of the additional Q parity of the target data in the second layer.

2. The method according to claim 1, wherein the storing the Q parity to the first backup storage device comprises:
  in response to receiving a request for increasing reliability of the storage system, storing the Q parity to the first backup storage device.

3. The method according to claim 1, further comprising:
  in response to data in the first portion of storage devices being modified, sending the request.

4. The method according to claim 3, wherein the storing the Q parity to the first backup storage device further comprises:
  determining the Q parity on the basis of a parity, determined according to the second algorithm, of modified data in the first portion of storage devices; and
  storing the determined Q parity to the first backup storage device.

5. The method according to claim 3, wherein the storage system comprises a first stripe comprising multiple storage devices in a first layer and at least one backup storage device in a second layer, wherein the sending the request comprises:
  in response to data in the first portion of storage devices in the first layer comprised in the first stripe being modified, setting a mark for the first stripe as a request for increasing reliability of the first stripe comprised in the storage system.

6. The method according to claim 5, wherein the storing the Q parity to the first backup storage device further comprises:
  determining the Q parity on the basis of a parity, determined according to the second algorithm, of modified data in the first portion of storage devices in the first layer of the first stripe; and
  storing the Q parity to the first backup storage device of the at least one backup storage device comprised in the first stripe.

7. The method according to claim 1, further comprising:
storing an R parity, determined on the basis of a third algorithm, of data in the first portion of storage devices to a second backup storage device of the at least one backup storage device in the second layer.

8. The method according to claim 1, further comprising:
in response to a first device among the multiple storage devices in the first layer failing, recovering data in the first device on the basis of data in a storage device other than the first device in the first layer.

9. The method according to claim 1, further comprising:
in response to the first backup storage device failing, determining the Q parity of the data in the first portion of storage devices on the basis of the second algorithm; and
recovering data in the first backup storage device on the basis of the Q parity.

10. The method according to claim 8, further comprising:
in response to a second storage device in the storage system failing, recovering data in the first device and the second device on the basis of data in a storage device other than the first device and the second device in the storage system.

11. A method for managing a storage system, the storage system comprising multiple storage devices in a first layer and at least one backup storage device in a second layer, the method comprising:
  in response to receiving a request for writing target data to the storage system, storing the target data to a first portion of storage devices among the multiple storage devices in the first layer;
  storing a P parity, determined on the basis of a first algorithm, of data in the first portion of storage devices to a second portion of storage devices among the multiple storage devices in the first layer, the single P parity of the data providing a first RAID level of reliability to the data in the first portion of storage devices;
  in a background process, storing a Q parity, determined on the basis of a second algorithm, of data in the first portion of storage devices to a first backup storage device of the at least one backup storage device in the second layer, the additional Q parity of the data providing a second RAID level of reliability to the data in the first portion of storage devices, the second RAID level providing an increased level of reliability to the data in the first portion of storage devices relative to the first RAID level;
  in response to data in the first portion of storage devices being modified, sending the request, the storage system comprising a first stripe comprising multiple storage devices in a first layer and at least one backup storage device in a second layer, the sending of the request comprising:
    in response to data in a first portion of storage devices in the first layer comprised in the first stripe being modified, setting a mark for the first stripe as a request for increasing reliability of the first stripe comprised in the storage system, the storage system comprising a second stripe comprising multiple storage devices in a first layer and at least one backup storage device in a second layer, the Q parity comprising a parity associated with the first stripe and a parity associated with the second stripe; and
  storing the parity associated with the first stripe and the parity associated with the second stripe to different storage devices.

12. The method according to claim 11, wherein storage devices in the first layer comprise at least one redundant array, wherein the storing the Q parity to the first backup storage device comprises:
  determining the Q parity on the basis of the second algorithm according to data in a first portion of storage devices and a second portion of storage devices comprised in each redundant array of the at least one redundant array; and
  storing the determined Q parity to the first backup storage device.

13. A device for managing a storage system, comprising:
one or more processors;
a memory coupled to at least one processor of the one or more processors;

computer program instructions stored in the memory which, when executed by the at least one processor, cause the device to execute a method for managing a storage system, the storage system comprising multiple storage devices in a first layer and at least one backup storage device in a second layer, the method comprising:

in response to receiving a request for writing target data to the storage system, storing the target data to a first portion of storage devices among the multiple storage devices in the first layer;

providing a first RAID level of reliability to the stored target data, the providing of the first RAID level of reliability comprising:

determining, on the basis of a first algorithm, a P parity of the target data stored in the first portion of storage devices; and storing the P parity to a second portion of storage devices among the multiple storage devices in the first layer;

in response to the storing of the P parity, returning a response indicating that the target data has been written to the storage system; and in a background process:

providing a second RAID level of reliability to the target data, the providing of the second RAID level of reliability comprising:

determining, in the background process, a Q parity of the target data on the basis of a second algorithm; and storing, in the background process, the Q parity to a first backup storage device of the at least one backup storage device in the second layer, the storage system having higher access efficiency due to the determining and the storing of the single P parity of the target data in the first layer, and the storage system having higher reliability due to the determining and the storing, in the background process, of the additional Q parity of the target data in the second layer.

14. The device according to claim 13, wherein the storing the Q parity to the first backup storage device comprises:

in response to receiving a request for increasing reliability of the storage system, storing the Q parity to the first backup storage device.

15. The device according to claim 13, wherein the method further comprising:

in response to data in the first portion of storage devices being modified, sending the request.

16. The device according to claim 15, wherein the storing the Q parity to the first backup storage device further comprises:

determining the Q parity on the basis of a parity, determined according to the second algorithm, of modified data in the first portion of storage devices; and storing the determined Q parity to the first backup storage device.

17. The device according to claim 15, wherein the storage system comprises a first stripe comprising multiple storage devices in a first layer and at least one backup storage device in a second layer, wherein the sending the request comprises:

in response to data in a first portion of storage devices in the first layer comprised in the first stripe being modified, setting a mark for the first stripe as a request for increasing reliability of the first stripe comprised in the storage system.

18. The device according to claim 17, wherein the storing the Q parity to the first backup storage device further comprises:

determining the Q parity on the basis of a parity, determined according to the second algorithm, of modified data in the first portion of storage devices in the first layer of the first stripe; and storing the Q parity to the first backup storage device of the at least one backup storage device comprised in the first stripe.

19. The method according to claim 1 wherein the providing of the first RAID level of reliability to the stored target data comprises providing a single-parity RAID level of reliability to the stored target data using the P parity.

20. The method according to claim 19 wherein the providing of the second RAID level of reliability to the stored target data comprises providing, concurrently with the providing of the first RAID level of reliability, at least a double-parity RAID level of reliability to the stored target data using at least the P parity and the Q parity.

* * * * *